UNITED STATES PATENT OFFICE.

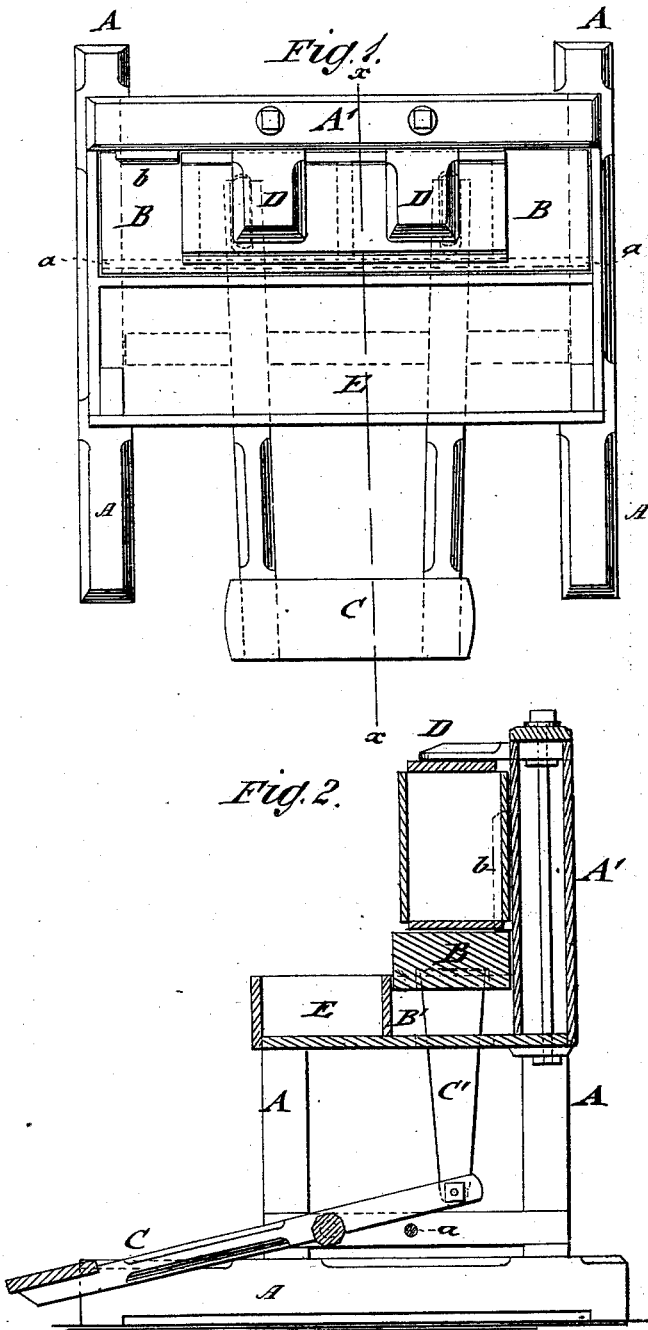

ROBINSON BUCKINGHAM AND CHARLES W. POINDEXTER, OF ALTO PASS, ILLINOIS.

FRUIT AND VEGETABLE PACKER.

SPECIFICATION forming part of Letters Patent No. 223,476, dated January 13, 1880.

Application filed June 28, 1879.

*To all whom it may concern:*

Be it known that we, ROBINSON BUCKINGHAM and CHARLES W. POINDEXTER, of Alto Pass, in the county of Union and State of Illinois, have invented a new and Improved Fruit and Vegetable Packer, of which the following is a specification.

In the accompanying drawings, Figure 1 represents a top view, and Fig. 2 a vertical longitudinal section on line $x\ x$, Fig. 1, of our improved fruit and vegetable packer.

Similar letters of reference indicate corresponding parts.

The object of this invention is to facilitate the pressing into boxes or packages of fruits and vegetables—as, for instance, peaches, early apples, pears, plums, or other fruit that will stand pressure when packed, or green pease, string-beans, sweet and Irish potatoes, tomatoes, and other vegetables.

The machine used for that purpose presses the fruit or vegetables by the lid into the box or package, and admits the convenient and quick nailing of the lid while being held on the box, so that a larger number of boxes may be packed at a saving of time and labor, and also a superior packing be produced.

The invention consists of a machine with nail-box and treadle-acted lift-block, that presses the box and lid against horizontal stationary top stops in such a manner that the lid may be nailed on directly to the headings of the box.

In the drawings, A represents the supporting-frame of our improved fruit and vegetable packing machine, and B the lift-block, that is guided in a horizontal part, B', of frame A, and raised by means of a treadle, C, and pivoted arms C', that pass through slots of the frame-part B' and enter socket-recesses of the lift-block B. When the lift-block is at the lowest point it is seated in the frame part B', the treadle resting then on a cross-rod, $a$, being ready for use.

The box or package, that is filled with fruit to a certain height above the upper edge, is placed on the lift-block and pushed against the back A' of frame A, the back having at one side a projecting stop-plate, $b$, that serves with its vertical edge as a projection or gage for the box, and with its lower horizontal edge as a stop for the lift-block.

The lid is placed on the fruit and pressed down by horizontal stops D, which are bolted or otherwise rigidly secured to the back A. The stops are arranged at some distance apart to admit the nailing of the lid when the fruit is properly pressed down on the center and outside headings, a sufficient space being left around the stops for nailing the lid without removing the box.

In front of the lift-block is arranged the nail-box E, that extends along the entire length of the machine, and serves for storing the nails and hammer. The machine produces the slow and gradual pressing in and packing of the fruit until the lid is on the box, when it is nailed on without relaxing the pressure, so as to admit the packing of a considerably larger quantity of fruit with this machine than by hand in the old style. The great advantage, however, of the machine consists in the entirely unbruised condition in which the fruit is packed, so that the same is put up solid at less expense and with greater convenience than heretofore.

Having thus described our invention, we claim as new and desire to secure by Letters Patent—

1. A machine for packing fruits and vegetables, consisting of a vertically sliding and guided lift-block, in combination with horizontal lid-holding stops secured to the top part of the machine, substantially in the manner and for the purpose set forth.

2. The combination of the vertically-movable lift-block B with guide-box B', and with back A' of frame A, having side stop-plate and gage, $b$, and horizontal lid-holding stops D, substantially as specified.

3. In a fruit and vegetable packer, a nail-box extending over the entire length of the machine in front of the lift-block, substantially as set forth.

ROBINSON BUCKINGHAM.
CHARLES W. POINDEXTER.

Witnesses:
R. R. TOWNES,
HIRAM × NORTON,
      his
W. S. DAY.
      mark.